United States Patent [19]

Petrecca

[11] Patent Number: 4,485,942
[45] Date of Patent: Dec. 4, 1984

[54] APPARATUS FOR MELTING AND DISPENSING THERMOPLASTIC MATERIAL

[75] Inventor: Peter J. Petrecca, Atlanta, Ga.
[73] Assignee: Nordson Corporation, Amherst, Ohio
[21] Appl. No.: 301,600
[22] Filed: Sep. 14, 1981
[51] Int. Cl.³ .............................................. B67D 5/62
[52] U.S. Cl. ................................. 222/146.5; 219/424
[58] Field of Search ........ 222/146 HE, 146 H, 146 R; 219/421, 424

[56] References Cited

U.S. PATENT DOCUMENTS

| | | | |
|---|---|---|---|
| 3,585,361 | 6/1971 | Rosen | 222/146 HE X |
| 3,711,681 | 1/1973 | Leuschner et al. | 222/146 HE X |
| 3,792,801 | 2/1974 | Nord et al. | 222/146 HE |
| 3,815,788 | 6/1974 | Reighard et al. | 222/146 HE |
| 3,827,603 | 8/1974 | Reighard et al. | 222/146 HE |
| 3,964,645 | 6/1976 | Scholl | 222/146 HE |
| 4,059,714 | 11/1977 | Scholl et al. | 222/146 HE X |
| 4,308,447 | 12/1981 | Notzold et al. | 222/146 HE X |

FOREIGN PATENT DOCUMENTS

| | | |
|---|---|---|
| 28071 | 10/1979 | European Pat. Off. |
| 37219 | 10/1981 | European Pat. Off. |
| 1935398 | 1/1971 | Fed. Rep. of Germany |
| 510185 | 7/1939 | United Kingdom ................ 219/424 |
| 1486390 | 2/1983 | United Kingdom |

Primary Examiner—Joseph J. Rolla
Assistant Examiner—Kevin P. Shaver
Attorney, Agent, or Firm—Wood, Herron & Evans

[57] ABSTRACT

An apparatus for melting and dispensing thermoplastic material comprising a melter tank, a pump contained within the melter tank, a dispenser, and a manifold block mounted on the bottom of the melter tank. Thermoplastic material melted in the tank flows from the melter tank through the pump through the manifold block to the dispenser. The melter tank comprises a novel electrical resistance heating element cast into the bottom wall of the tank. The heating element is asymetrically shaped within the bottom wall of the melter tank and is so configured that the length of the heater element within any portion of the bottom wall is proportional to the mass of material, including melter tank, manifold block, pump, and thermoplastic material to be heated by the given length of heater element within that portion. Additionally, the tank side walls are generally triangular in cross section with the thicker part of the triangular shaped side walls located adjacent the bottom of the tank. A portion of the heating element is located directly under each side wall so that heat is effectively conducted from the bottom wall into the side walls, and from the side walls into the thermoplastic material contained within the tank.

4 Claims, 6 Drawing Figures

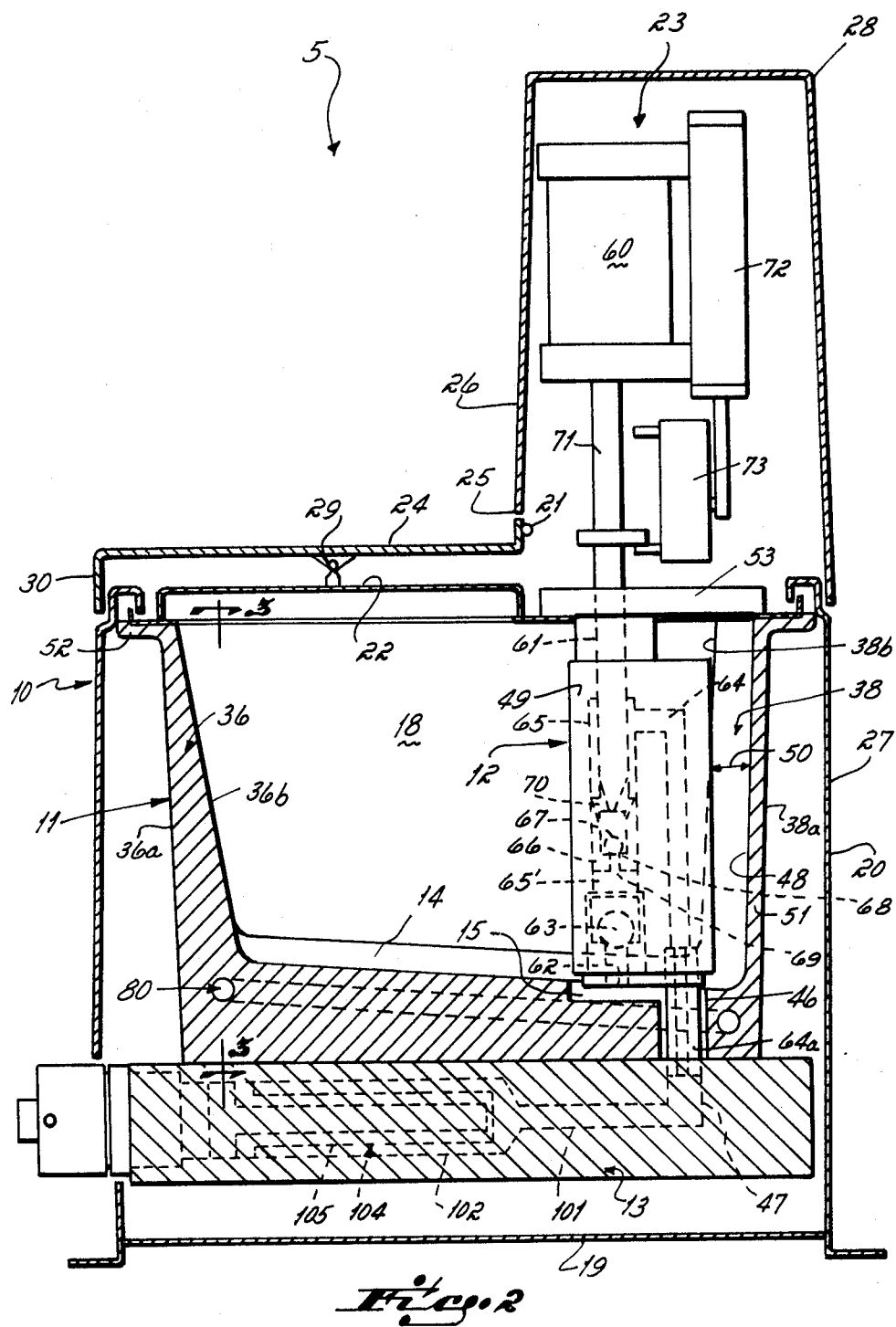

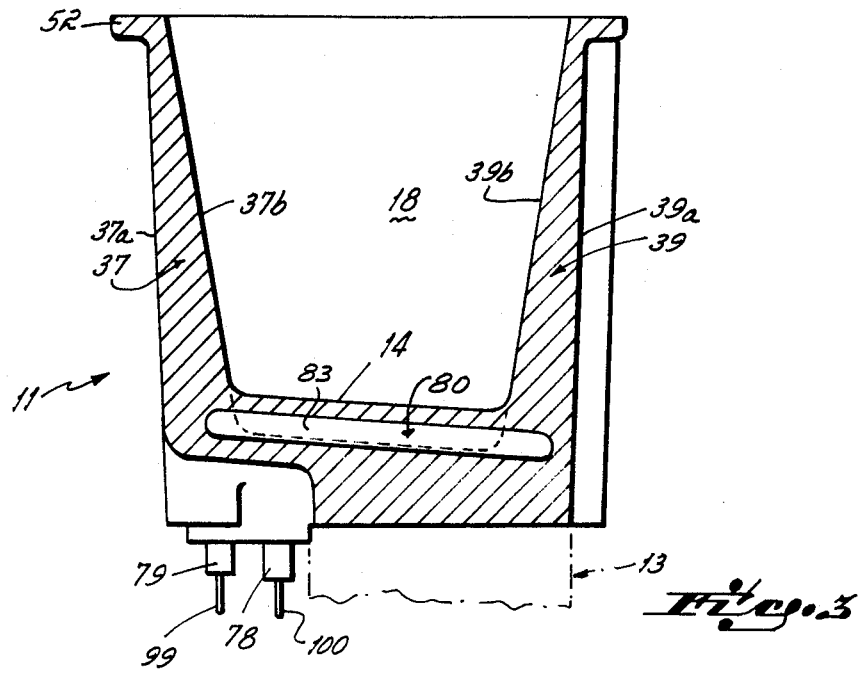
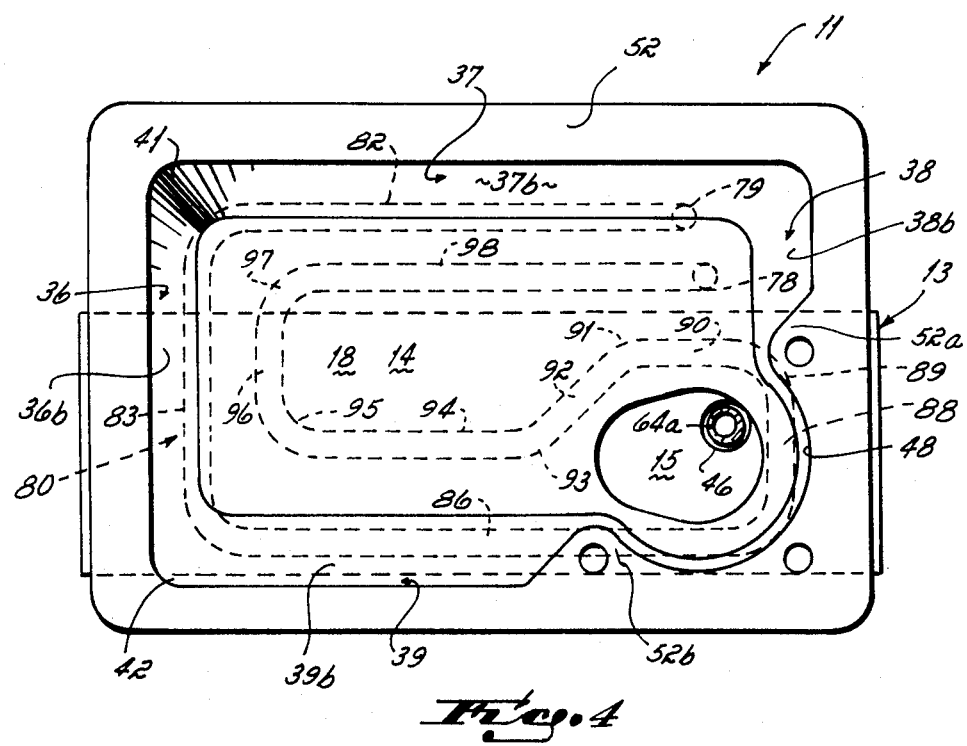

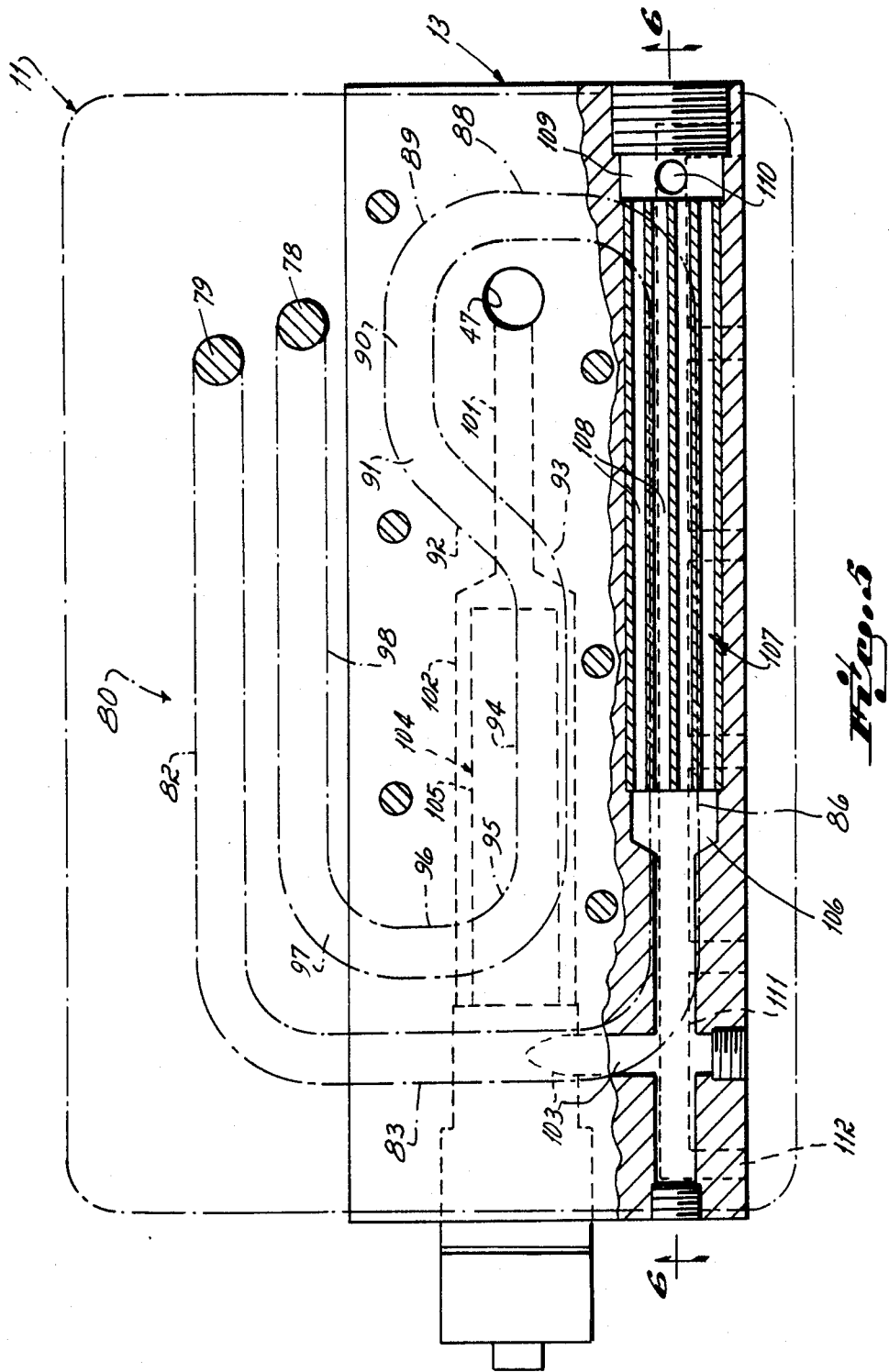

APPARATUS FOR MELTING AND DISPENSING THERMOPLASTIC MATERIAL

This invention relates to apparatus for melting and dispensing thermoplastic material and more particularly to an improved apparatus for melting thermoplastic material and maintaining it in the molten state.

Conventionally, thermoplastic materials, or so-called "hot melt" materials, are used as adhesives or sealants. These materials are all characterized by being solid at room temperature and molten at a temperature substantially above room temperature, usually a temperature on the order of 250° F. to 400° F. These materials are all supplied in the molten state by a dispenser or applicator from which the material is distributed onto a substrate. Once distributed onto the substrate, the materials are exposed to atmospheric temperature, at which the thermoplastic materials set up or solidify very quickly. Most thermoplastic materials are chosen for a particular application because of their quick set time.

A characteristic of most "hot melt" materials is that they oxidize, char, or degrade when exposed to heat substantially above their melting temperature or when exposed to heat in the molten state for a protracted length of time. In the case of most hot melt adhesives this degradation results in the material losing its adhesive property and becoming charred. Because of this thermal degradation characteristic, temperature control of the thermoplastic material, both during melting and for so long as the material remains molten is critical. Otherwise expressed, the material must not be exposed to excessive temperatures during melting or until distributed onto the target substrate. A consequence of this inability to expose the material to a temperature substantially above the melting temperature is that a prolonged period of time is usually required to convert a substantial quantity of solid thermoplastic material to the molten state so that it may be distributed onto the target substrate.

One of the primary factors in determining the time required to melt a given quantity of thermoplastic material is the efficiency of the equipment within which the material is to be melted. The evenness of the heat imparted by that equipment to the solid thermoplastic material determines not only the efficiency but the amount of degradation or char experienced by that solid thermoplastic material during its conversion from the solid to the thermoplastic state. In other words, if the melting apparatus has hot spots it will subject selected portions of the solid thermoplastic material to excessive temperatures and consequent thermal degradation. On the other hand, if the equipment has cold spots therein, it will be relatively inefficient and will take protracted lengths of time to convert a given quantity of solid thermoplastic material from the solid to the molten state.

It has therefore been a primary objective of this invention to provide an improved apparatus for melting thermoplastic material and for maintaining it in the molten state. Otherwise expressed, it has been an objective of this invention to provide a thermoplastic melting apparatus which is more even heating and more efficient than heating apparatus now in use for that purpose.

In the past, apparatus for melting the solid thermoplastic materials and converting them to the molten state have generally consisted either of tank type melters, as for example disclosed in U.S. Pat. No. 3,827,603 or of grid type melters, as for example disclosed in U.S. Pat. No. 3,792,801 and U.S. Pat. No. 3,964,645. The grid type melters generally operate upon the principle of supporting the solid thermoplastic material upon the top of a heated open grid, which grid is maintained at a temperature substantially above the melting temperature of the thermoplastic material. The solid material is melted upon contact with this grid and falls through the grid into a relatively small reservoir located beneath the grid. From this reservoir the molten material is pumped to the dispenser. Grid type melters are more efficient than tank type melters but are generally much more expensive because they operate at higher temperatures, subject the molten material to higher temperatures, require greater temperature control, etc.

Tank type melters, as opposed to grid melters, operate upon the principle of utilizing heated walls of a tank to impart sufficient heat to solid thermoplastic material contained within the tank to melt it and convert it to the liquid state. Conventionally, tank type melters utilize a single heating element cast into the bottom wall of the tank to generate the heat required to melt the thermoplastic material. The tank type melters are generally much less expensive than grid melters. The invention of this application is concerned with thermoplastic melting and dispensing apparatus of a tank melter type as opposed to the grid melter type.

It has been one objective of this invention to provide an improved melter tank for use in apparatus for melting and dispensing thermoplastic material which is more efficient and which is more even heating than prior art tank melters. Because of this improved efficiency, the melter tank of this invention is capable of melting a greater quantity of thermoplastic material at a higher melt rate than prior art units employing tank melters of comparable physical size.

The melting and dispensing apparatus of this invention which accomplishes these objectives comprises a tank melter, a pump mounted within the melter, a manifold block attached to the melter for receiving thermoplastic material from the pump and for distributing it to a conventional applicator or dispenser. The melter tank of this invention has a constant diameter, fixed electrical resistance, heating element cast into the bottom wall of the tank. The heating element is asymetrically configured within the bottom wall so that the length of the heating element within any selected portion of the tank is proportional to the mass of material including the mass of the tank, manifold block, pump and thermoplastic material to be heated by the length of heating element contained within that portion of the tank. The tank comprises a bottom wall and four side walls. The electrical heating element is located in the bottom wall of the tank. The side walls of the tank are triangular in cross section with the thickest cross sectional portion of the triangular shaped walls located at the bottom so that each wall acts as a triangular shaped heat conduction fin for efficiently conducting heat from the bottom of the wall to the top. A part of the heating element is located directly beneath each side wall so as to maximize the efficient transfer of heat from the heating element into the side walls. The manifold block and the pump of the apparatus are both heated solely from the heating element contained within the bottom wall of the tank. The manifold block is mounted on the bottom wall with a portion of the heating element overlying the flow path of molten material through the manifold block so as to maximize the efficient heat transfer from the tank heating element to the molten material contained within the manifold block. The pump is mounted within one corner of the heating tank with a length of the heating element wrapped around that corner beneath the pump so as to maximize efficient transfer of heat from the heating element into thermoplastic material.

The primary advantage of this invention resides in its ability to melt greater quantities of thermoplastic material in a period of time than has heretofore been possible with tank type thermoplastic melting and dispensing units of comparable size.

These and other objects and advantages of this invention will be more readily apparent from the following description of the drawings in which:

FIG. 2 is a cross sectional view through the apparatus of FIG. 1.

FIG. 3 is a cross sectional view through the melter tank taken on line 3—3 of FIG. 2.

FIG. 4 is a top plan view of the melter tank employed in the apparatus.

FIG. 5 is a top plan view, partially broken away of the manifold block but with the heating element of the melter tank superimposed in phantom lines over the top of the manifold block to illustrate the relative location of the heating element of the melter tank and the flow conduits of the manifold block.

Figure 1:
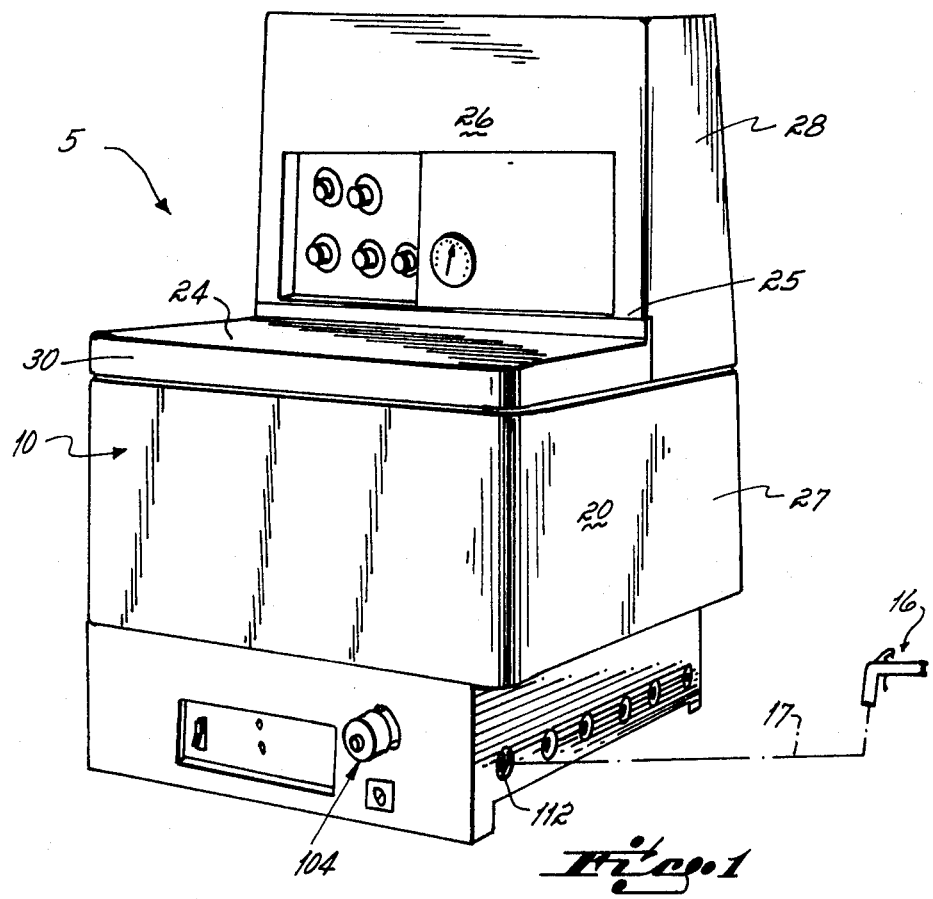
FIG. 1 is a perspective view of a thermoplastic material melting and dispensing apparatus incorporating the invention of this application.

Referring first to FIGS. 1 and 2 it will be seen that the thermoplastic material melting and dispensing apparatus 5 of this invention comprises a housing 10 within which there is located a tank melter 11, a pump 12, and a manifold block 13. Solid thermoplastic material in the form of chunks, pellets, or blocks are placed in the melter tank 11 where they are melted and from which they flow via a sloping bottom wall 14 toward a recess or pump inlet 15 for the pump 12. The pump then causes the molten material to be supplied under pressure into the manifold block 13 from whence it is directed to one or more conventional applicators or dispensers 16 via hoses or conduits indicated diagrammatically at 17.

Housing

The housing 10 comprises a sheet metal base plate 19 and a fiberglass reinforced plastic shroud 20 mounted atop that base plate. The shroud 20 comprises a base section 27 and a console section 28 mounted atop the base section 27. The base section encloses or encases the melter tank 11 and manifold 13 while the console section 28 encloses the drive section 23 of the pump 12 and selected electrical control components of the control circuits for controlling the temperature of the heated components throughout the system. The base section of the housing also includes a hinged cover 24 connected to the housing at the upper edge of the side wall 27 by a conventional hinge pin 21. Attached to the inside of the hinged cover there is a lid 22 which covers the open top of the heater tank 11. A snap-fit type connector 29 interconnects the tank lid 22 to the hinged cover 24 so that when the cover 24 is opened by lifting the front edge 30 upwardly about the hinge pin 21, the lid 22 is correspondingly moved with the cover so as to expose the interior 18 of the tank 11. Thereby the inside 18 of the tank 11 is exposed so that it may be filled with solid thermoplastic material.

The housing 10 including the hinged cover 24, the lid 22 and the snap-fit connector 29 between the cover 24 and lid 22 per se form no part of the claimed invention of this application and therefore have not been described in great detail herein.

Melter Tank

The melter tank 11 comprises a metal casting having the bottom wall 14 and four side walls 36, 37, 38 and 39. The tank is open at the top so that solid thermoplastic material may be placed within the top when cover 24 and the attached tank lid 22 are open.

The side walls 36, 37, 38 and 39 of the tank are all generally triangular in cross sectional configuration as may be seen most clearly in FIGS. 2 and 3. The outer surface 36a, 37a, 38a, and 39a of each wall is located in a nearly vertical plane. The inside surface 36b, 37b, 38b and 39b of each wall slopes downwardly and inwardly with the result that the top edge of each wall is thinner than the bottom edge. As explained more fully hereinafter, this taper of the walls functions to facilitate heat transfer from the base of each wall upwardly. Thus, each side wall acts as a fin to efficiently conduct heat upwardly from the heated bottom wall 14 of the tank into thermoplastic material contained within the tank.

The bottom wall 14 of the tank slopes downwardly from the side walls to one corner where the pump inlet or recess 15 receives the bottom of the pump 12. This recess 15 is open to a vertical port 46 which extends through the bottom of the tank and is open to a conduit 47 contained within the manifold block 13. As a consequence of the sloping bottom wall of the tank, all molten material within the tank flows downwardly over the tank and ultimately into the recess 15.

With reference to FIGS. 2 and 4 it will be seen that one corner of the melter tank 11 has a vertical recess 48 formed therein which is arcuate in configuration and which is adapted to receive the cylinder of the pump 12. A clearance gap 50 between the vertical side wall of the pump cylinder and the arcuate vertical wall 51 of the recess 48 is in open communication with the interior of the tank so that any molten material contained therein flows downwardly and ultimately into the recess 15 in the bottom of the tank.

Extending outwardly from the top edge of each side wall 36, 37, 38, 39 there is a flange 52. As may be seen most clearly in FIG. 4 this flange extends completely about the top edge of the tank. At the corner within which the pump 12 is mounted, the flange 52 has protrusions 52a and 52b extending inwardly over the tank side walls so as to facilitate attachment of a mounting plate 53 of the pump.

An electrical heating element in the form of a constant diameter, fixed resistance, heating element 80 is cast into the bottom wall 14 of the tank. This heating element is asymmetrically configured within the bottom wall so as to impart heat to selected areas of the bottom wall in proportion to the heat required to melt and then maintain thermoplastic material in those selected areas at a preselected optimal temperature.

With particular reference to FIGS. 3, 4 and 5 it will be seen that ends 78, 79 of the electrical heating element 80 extend from the bottom of the tank and terminate in electrical connectors 99, 100. The end 79 of element 80 extends upwardly from the electrical connector 99 into the tank bottom wall 14 and is bent at a right angle to form a first linear section 82 which extends for the length of the side wall 37 beneath that side wall. The heating element is then bent at a right angle in the corner 41 of the tank and forms a second linear section 83 which extends beneath the end wall 36. The heating element then is bent at a right angle in corner 42 and continues in a third linear section 86 which extends for the length of the side wall 39 beneath that side wall. The heating element then is bent in another 90° angle in the corner at vertical recess 48 and continues in a fourth linear section 88 which extends beneath a portion of the end wall 38 at vertical recess 48. The linear section 88 extends for approximately one-half the length of the end wall 38 and then is bent inwardly in another 90° bend or turn as indicated at 89 and extends in a fifth linear section 90 toward the middle of the tank. The linear section 90 terminates in a 45° bend as indicated at 91 and then continues in a sixth linear section 92 toward the side wall 39. The heating element then is bent in another 45° angle as indicated at 93 and continues into a seventh linear section 94 which extends parallel to but inwardly spaced from the third linear section 86. The seventh linear section 94 then is bent in another 90° angle as indicated at 95 and continues into an eighth linear section 96 which extends parallel to but is spaced from the second linear section 83. The eighth linear section terminates in another 90° bend as indicated at 97 and continues into a ninth linear section 98 which extends parallel to but is spaced from the first linear section 82. The end of the ninth linear section 98 terminates in the downwardly bent end section 78 which ends in the electrical connector 100.

It is to be noted that all nine linear sections of the heating element are cast into the bottom wall 14 and are located in a common angled or slanted plane which is parallel to the slope of the bottom wall 14 of the melter tank 11. Additionally, it is to be noted that the third, fourth, fifth and sixth linear sections 86, 88, 90, 92 respectively form the major portion of a circle which is wrapped around the recess 15 in the bottom of the tank and the pump located above that recess. Consequently, a very substantial portion of the heat imparted to the tank by the heating element is imparted to the area within which the pump is mounted.

As explained more fully hereinafter, the third and seventh linear sections 86 and 94 respectively and 45° bend 93 of the heating element are located directly over the molten material flow paths or conduits of the manifold block 13 such that heat from those sections of the heating element 80 is imparted directly to these flow paths of the manifold block.

The asymetrical configuration of the heating element within the bottom wall 14 of the tank is such that the length of heating element within any single portion of the tank is proportional to the mass of material including the tank, manifold, pump, and thermoplastic material required to be heated by that portion of the tank bottom wall. This configuration thus maximizes the efficiency of the heater element and maintains an even temperature of molten thermoplastic material throughout the tank, manifold, and pump. This evenness of the temperature is critical to prevent the molten material from overheating, charring and degrading to the point of losing its adhesive or sealant properties.

Pump

The pump 12 illustrated herein is a conventional double acting reciprocating piston pump. A complete description of this pump 12 and the air motor 60 for actuating it may be found in U.S. Pat. No. 3,585,361 for "Supply System for Thermoplastic Materials", which patent issued on June 15, 1971 and is assigned to the assignee of this application. Briefly, it comprises the cylinder 49 having a chamber 65 therein within which a piston 66 is reciprocable. At the lower end of the cylinder 49 there is an inlet 62 which opens into the recess 15 of the melter tank 11. This pump inlet 62 is closed at its upper end by a ball check 63. An outlet passage 64 at the upper end of the cylinder chamber 65 is in fluid communication with the chamber 65 and the passage 47 of the manifold block 13.

In the operation of the pump, when the piston 66 which is attached to the lower end of a piston rod 61 is raised, the volume of chamber 65 above the piston is filled with liquid thermoplastic material. That volume of thermoplastic material is then forced as the piston 66 rises to flow out through the passage 64 at the upper end of the chamber 65. During this upward movement a ball check 67 contained within the piston is held tightly against its seat 68 so that there is no liquid flow from the chamber 65 above the piston through the piston 65 to the lower portion 65' of the chamber located beneath the piston 66. During this upward movement of the piston 66 the lower ball check 63 is lifted upwardly off of its seat in response to the pressure of incoming material seeking to fill the void left by piston 66. When piston 66 has completed its upward stroke, lower chamber 65' is filled with liquid material which has been drawn in on the upward stroke. On the downward stroke of piston 66, ball check 63 seats and remains firmly seated while ball check 67 is moved upwardly on its seat permitting displaced material to move upwardly through piston inlet 69 past ball check 67 and through ports 70 to displace material in the chamber 65 forced outwardly through the outlet conduits 64.

The air motor 60 of the pump comprises a cylinder housing within which a pneumatic piston reciprocates to drive a connecting rod 71 attached to the upper end of the piston rod 61. Air is supplied to the opposite sides of the piston motor under the control of a conventional 4-way valve 72. A complete description of the piston motor 60 and 4-way valve 72 as well as an over-center mechanism 73 for controlling positioning of the valve 72 may be found in the above identified U.S. Pat. No. 3,585,361. Since the operation of the pneumatic piston motor 60, valve 72 and the over-center mechanism 73 is conventional, it has not been illustrated and described in detail herein.

Manifold Block

Figure 6:
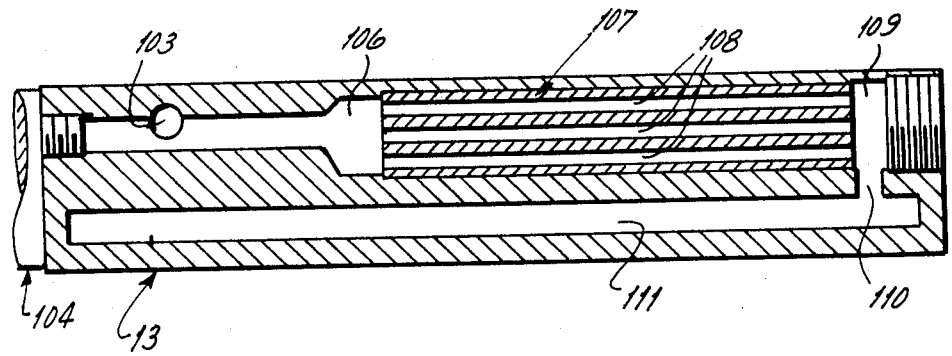
FIG. 6 is a cross sectional view through the manifold block taken on line 6—6 of FIG. 5.

The manifold block 13 is best illustrated in FIGS. 5 and 6. In FIG. 5 the tank 11 and the heating element 80 are overlaid in phantom lines atop the manifold block so as to illustrate the location of the heating element 80 relative to the flow conduits in the manifold block.

With reference to FIG. 2, it will be seen that molten material from the pump 12 enters the inlet port 47 of the manifold block from a nozzle extension 64a of the pump. The inlet port 47 is connected to a horizontal passageway 101 of the manifold block which communicates with a filter chamber 102 of the block. Within this chamber there is a conventional thermoplastic material filter 104. One such filter which is suitable for use in a manifold block 13 is the subject of U.S. Pat. No. 3,912,630 of Reighard, et al which issued on Oct. 14, 1975 and is assigned to the assignee of this application.

The filter contains a filtering screen, indicated diagrammatically at 105, which is operative to entrap any solids and prevent them from passing through the filter to a transverse filter exit passageway 103. The filter exit passageway is in turn connected to a heat exchanger passage 106 which extends for the length of the manifold block. Within the heat exchanger passage 106 there is a heat exchanger 107 in the form of a heat conductive metal block having multiple longitudinal passages 108. These passages 108 extend for the length of the heat exchanger and open into an end chamber 109 which is connected by a conduit or bore 110 with an outlet passage 111 of the manifold block. Multiple outlet ports 112 are in fluid communication with this outlet passage 111 such that the hoses 17 or other conduits may be connected to the outlet ports so as to connect those ports with conventional hot melt dispensers or guns 16.

With reference now to FIG. 5 it will be noted that the linear section 86 of the heating element which extends beneath the side wall 39 of the melter tank for the length of that wall is also mounted directly over the heat exchanger passage 106 of the manifold block. Consequently, heat from this linear section 86 of the heating element 80 is transmitted directly through the metal walls of the tank and manifold block directly into the metal heat exchanger 107 and consequently to the molten material contained within the heat exchanger. That molten material is thus maintained at an optimal temperature at which it is neither so hot that it degrades nor so cool that it begins to solidify and become too viscous to pump from the gun or dispenser 16.

Operation

In the operation of the melting and dispensing apparatus 5 of this invention, an operating cycle is initiated by lifting of the hinged cover 24 upwardly together with the attached lid 22 so as to expose the open top of the tank 11. Solid thermoplastic material or so-called hot melt material in the form of chunks, pellets or blocks are then dumped into the tank 11 and the cover 24 closed. Electrical power to the heating element 80 is then turned on via a conventional electrical switch on the front of the housing. The heating element 80 then functions to heat the bottom and side walls of the melter tank 11 to a temperature controlled by a thermostat (not shown) at which temperature the solid thermoplastic material contained within the tank melts and converts to the molten state. That molten material then flows downwardly into the recess 15 at the bottom of the tank from which it is pumped by the piston pump 12 through the pump outlet passage 64 into the inlet port 47 of the manifold block 13. From that inlet port the molten material flows under pressure through the filter chamber 102, the filter 104 into the heat exchanger passage 106. After passage through the heat exchanger 107, the molten material flows into the outlet passage 111 of the manifold block to the outlet ports 112 from which the molten material is flowed via hoses or conduits 17 to conventional dispensers 16.

It is important to note that in the operation of this apparatus only a single heating element 80 is operative to heat the melter tank 11 including its side walls 36, 37, 38, 39 as well as the pump 12 and manifold block 13. There are no auxilliary heaters for either the pump or manifold block. The heating element 80 is so configured and so positioned relative to the tank side walls, the pump, and the manifold block, that no other source of heat is required to maintain the molten material in the tank, pump, manifold block in the molten state at a predetermined temperature. This configuration and style of cast-in heater element has been found to be very efficient for melting thermoplastic materials and supplying them to thermoplastic dispensers with the result that this apparatus has a higher throughput than earlier thermoplastic melter and dispenser systems of the tank melter style of comparable size and electrical current wattage.

While I have described only a single preferred embodiment of my invention, persons skilled in the art to which it pertains will appreciate changes and modifications which may be made without departing from the spirit of my invention. Therefore, I do not intend to be limited except by the scope of the following appended claims.

I claim:
1. Apparatus for melting solid thermoplastic material and for supplying the molten thermoplastic material to a dispenser, said apparatus including a melter tank, said tank comprising
    a bottom wall and four side walls extending upwardly from said bottom wall,
    each of said side walls being generally triangular in cross sectional configuration with the base of each of said triangular cross sectional side walls being of greater thickness than the upper edges such that said side walls act as effective heat conductive fins for transferring heat upwardly from the base of said side walls, and
    a single continuous length of electrical resistance heating means mounted within said bottom wall, a portion of said electrical resistance heating means being located beneath each of said side wall, and the length of electrical resistance heating means mounted within any one portion of said bottom wall being generally proportioned to the mass of said melter tank including the side walls and adhesive required to be heated by said length of electrical resistance heating means mounted within said one portion,
    a manifold block attached to the bottom exterior surface of said melter tank,
    conduit means contained within said manifold block for receiving molten material from said melter tank and transmitting it to said dispenser,
    said manifold block being in heat transfer contact with a substantial area of said exterior wall of said melter tank, the heat transferred from said melter tank into said manifold block being the sole source of heat within said manifold block for maintaining molten material contained within said manifold block conduit means in the molten state,
    a substantial portion of said conduit means of said manifold block extending parallel to and being located directly beneath a portion of said electrical resistance heating means,
    a pump located within said melter tank, said pump being operative to supply molten material under pressure from said melter tank to said manifold block, and
    said electrical resistance heating means being the sole external source of heat to said pump for maintaining molten contained within said pump in the molten state.

2. The apparatus of claim 1 in which said pump is located in one corner of said tank, said electrical resistance heating means being wrapped around said one corner in the bottom wall of said tank so as to maximize the heat imparted to said pump from said heating means mounted within said bottom wall.

3. The apparatus of claim 2 in which said pump and manifold block are both mounted on one side of said melter tank, the bottom wall on said one side of said melter tank having a substantially greater length of electrical resistance heating means mounted therein than the other side of said bottom wall.

4. The apparatus of claim 1 wherein said electrical resistance heating means comprises a first straight section connected to a flat U-shaped section, said first U-shaped section being connected to a second straight section, said second section being connected to a generally S-shaped section and said S-shaped section being connected to a third straight section, and all of said sections of said electrical resistance heating means being located in a common plane contained in said bottom wall of said melter tank.

* * * * *